UNITED STATES PATENT OFFICE.

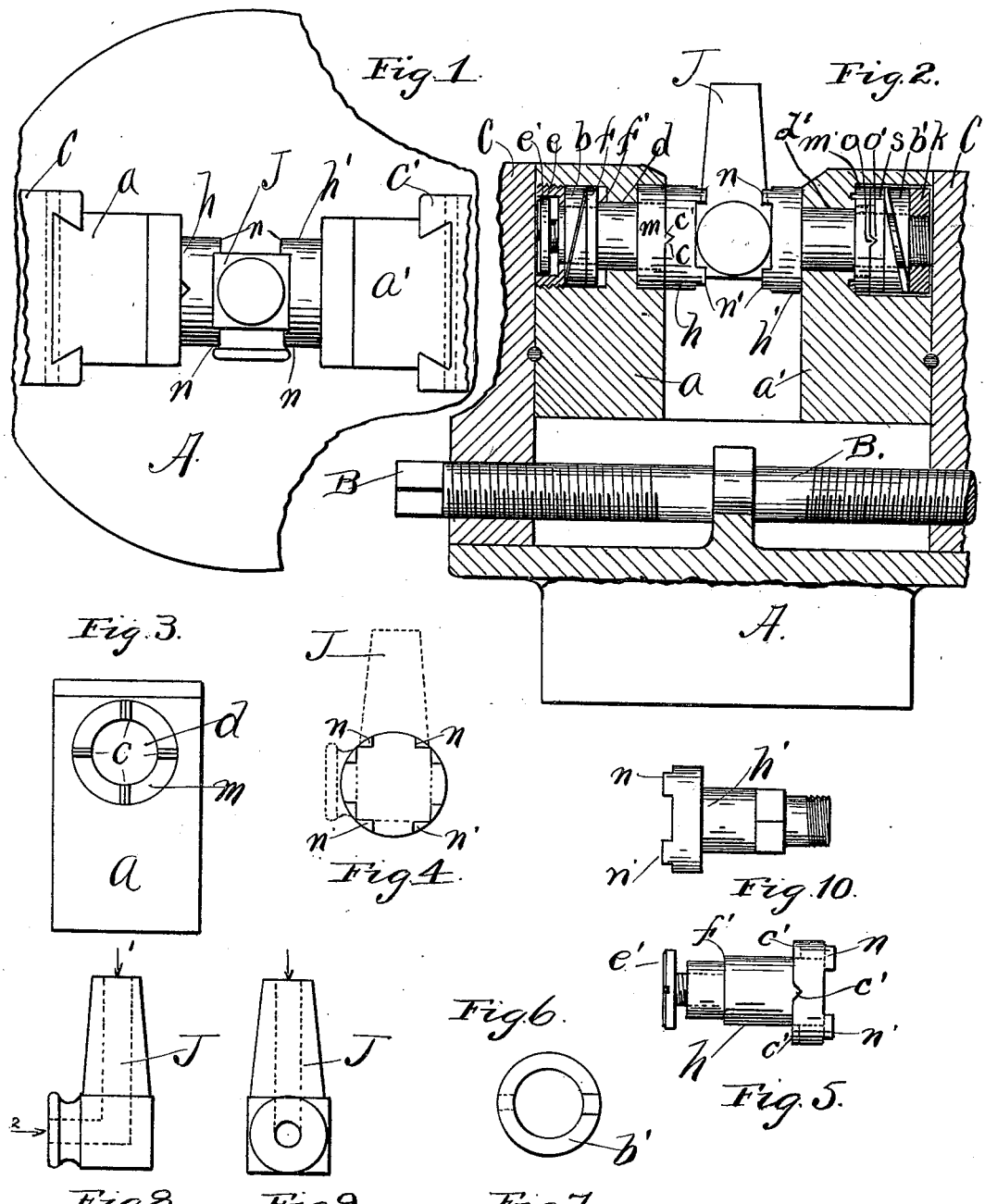

OWEN F. GARVEY, OF PROVIDENCE, RHODE ISLAND, ASSIGNOR TO THE UNITED STATES SAFETY GAS COCK COMPANY, OF SAME PLACE.

AUTOMATIC CHUCK.

SPECIFICATION forming part of Letters Patent No. 635,243, dated October 17, 1899.

Application filed June 28, 1899. Serial No. 722,139. (No model.)

*To all whom it may concern:*

Be it known that I, OWEN F. GARVEY, of Providence, in the county of Providence and State of Rhode Island, have invented certain new and useful Improvements in Automatic Chucks; and I do hereby declare that the following is a full, clear, and exact description thereof, reference being had to the accompanying drawings, and to the letters of reference marked thereon, which form a part of this specification.

This invention consists in constructing a chuck for holding work in a lathe and other machines in such a manner that the article can readily be changed in position to be operated upon on different sides and in different directions without having to be removed from the chuck and reset. It is fully explained and illustrated in this specification and the accompanying drawings.

Figure 1 is a front view of a two-jawed universal chuck with the improvements attached. Fig. 2 shows a side view of the chuck with a piece of work in it, with some of the parts represented in section. Fig. 3 represents a face view of one of the blocks attached to the jaws of the chuck. Fig. 4 is a face view of the rotating blocks that hold the work in the chuck. Fig. 5 shows a side elevation of one of the rotating blocks. Fig. 6 is a face view of the spring-washers used in the blocks. Fig. 7 is an edge view of the spring-washers. Figs. 8 and 9 represent different sides of the gas-cock shown in the chuck in Figs. 1 and 2. Fig. 10 shows a side view of the other rotating block.

The object of this invention is to facilitate the work done in chucks on articles that have to be operated on by drilling, turning, &c., on different sides by making it possible to readily change the position of the piece in the chuck for the different operations without having to release the article and readjust it.

The construction and operation of the improvements are as follows:

In Figs. 1 and 2 of the drawings A represents a two-jawed chuck which in its main parts may be made in most any of the usual ways. C C' are the two jaws, and B is the screw that moves the jaws toward or from the center of the chuck, which screw is usually made with a right-hand thread for one jaw and a left-hand thread for the other jaw. A block $a$ is attached to the inner face of one of the jaws C, preferably by dovetailing, as seen in Fig. 1. This block $a$ has a hole or socket $d$ made through it, (see Fig. 3, which is a face view,) and the inner half of the socket $d$ is bored out larger, as shown in Fig. 2. A cylindrical block $h$ is turned down for the greater part of its length to fit closely in the smaller part of the socket $d$ in the block $a$, and the inner half of the block $h$ is turned down still smaller to receive a spring-washer $b$ and a nut $e$, that is screwed into the inner end of the socket $d$. The nut $e$ is recessed in on one side to receive the head of a screw $e'$, that is screwed into the end of the block $a$, and the head of the screw $e'$ is made larger than the hole in the nut $e$ to keep the block $h$ from coming out of the block $a$. A washer $f$ is fitted loosely on the smaller part of the block $h$ to rest on a shoulder $f'$ and convey the pressure of the spring-washer $b$ and push the block $h$ outward. A steel collar $m$ is made fast in the face of the block $a$, and a set of radial V-shaped ridges $c\ c$ (shown in Fig. 3) are made on the outer face of the collar to receive corresponding-shaped grooves $c'\ c'$ made on the shoulder of the block $h$. A similar block $a'$ is dovetailed on the face of the other jaw C', and a like socket $d'$ is made through it to receive a cylindrical block $h'$, which is made to fit closely, as described of block $h$; but in this case a nut $k$ is fitted to screw on the inner end of the block $h'$, and the smaller part of the block, between the nut $k$ and the shoulder, is made square to receive a steel washer $s$ and a spring-washer $b'$. A steel collar $m'$ is made fast against the shoulder in the block $h'$, and radial V-shaped ridges $o\ o$ are made on its inner side, and corresponding grooves $o'\ o'$ are made in the adjacent face of the washer $s$ to receive the ridges $o\ o$.

The outer faces of both blocks $h$ and $h'$ have projections $n$ and $n'$ made on them (see Fig. 4) to hold the piece of work J, which in this case is a gas-cock; but the number and position of the projections on the blocks may be varied to accommodate different kinds of work.

To operate the chuck, the square end of the gas-cock is placed between the blocks $h\ h'$, resting against and confined by the projections $n\ n'$, and the jaws of the chuck are tightened up with a wrench applied to one end of the screw B. Then a hole can be drilled in the projecting long end of the cock in the direction of the arrow 1 in Figs. 8 and 9 and the outside turned off. The screw B is then eased up a little, and the cock, with the blocks $h\ h$, is turned a quarter-turn, the spring-washer $b$ allowing the block $h$ to fall back in its socket in the plate sufficiently to allow the ridges $c$ to pass from one groove $c'$ to another, and the spring-washer $b'$ allowing the washer $s$ to be pushed in, so as to allow the ridges on block $h'$ to pass the grooves in the washer, and as the chuck-screw B is again tightened up the ridges $c$ and $o$ will center themselves correctly in another set of the V-grooves $c'$ and $o'$ again, so that the work will be accurately held and another hole can be drilled in it in the direction of arrow 2 in Figs. 8 and 9.

Having thus described my improvements, I claim as my invention and desire to secure by Letters Patent—

1. In a combination-chuck the combination with the jaws of the chuck of stationary blocks attached to the faces of the jaws, blocks held to rotate in sockets, in said stationary blocks, a spring-washer arranged to bear on one of the rotating blocks and press it out of its socket, a spring-washer arranged to draw the other rotating block into its socket in its plate, substantially as described.

2. In a chuck, the combination with its jaws of stationary blocks attached to the faces of said jaws, blocks fitted to rotate in sockets in said stationary blocks, a spring-washer arranged to press one of said rotating blocks out of its socket in the stationary block, a set of radial ridges made around the socket in one of the stationary blocks one or more radial grooves made on one of the rotating blocks arranged to fit in said radial groove, substantially as described.

3. In a chuck, the combination with its jaws of stationary blocks attached to the faces of said jaws, blocks fitted to rotate in sockets in said stationary blocks, a spring-washer arranged to draw one of the rotating blocks into its socket in its stationary block, a collar made fast in said socket and having radial ridges made on its inner face, a washer held to turn with said one of the rotating blocks and having radial grooves made in its face adjacent to said radial ridges to receive them, substantially as described.

In testimony whereof I have hereunto set my hand this 27th day of June, A. D. 1899.

OWEN F. GARVEY.

In presence of—
BENJ. ARNOLD,
M. E. CLEVELAND.